(12) United States Patent
Small

(10) Patent No.: US 6,491,054 B1
(45) Date of Patent: Dec. 10, 2002

(54) METHOD AND APPARATUS FOR CONSTRUCTING MODULAR FLUID CONTAINMENT TANKS

(76) Inventor: John D. Small, 675 3rd St., Bennet, CO (US) 80102

(*) Notice: Subject to any disclaimer, the term of this patent is extended or adjusted under 35 U.S.C. 154(b) by 39 days.

(21) Appl. No.: 09/849,545

(22) Filed: May 4, 2001

Related U.S. Application Data

(63) Continuation-in-part of application No. 09/296,963, filed on Apr. 22, 1999, now Pat. No. 6,227,396.

(51) Int. Cl.[7] .............................. F16L 55/18; B65D 6/00
(52) U.S. Cl. .................. 137/15.09; 137/571; 220/4.13; 220/675; 277/602; 277/627
(58) Field of Search ........................ 137/571, 15.09; 220/4.13, 601, 672, 675; 277/387, 431, 549, 558, 314, 602, 627

(56) References Cited

U.S. PATENT DOCUMENTS

| | | | |
|---|---|---|---|
| 4,359,167 A | 11/1982 | Fouss et al. ............... 220/675 |
| 4,527,927 A | 7/1985 | Bucherre ..................... 405/53 |
| 4,582,221 A * | 4/1986 | Lamb et al. ................ 220/465 |
| 4,961,670 A | 10/1990 | McKenzie ................... 405/53 |
| 5,133,475 A | 7/1992 | Sharp ......................... 220/589 |
| 5,257,652 A * | 11/1993 | Lawrence | |
| 5,366,318 A * | 11/1994 | Brancher ..................... 405/36 |
| D357,530 S | 4/1995 | Grenier ..................... D23/203 |
| 5,544,460 A | 8/1996 | Fife ........................... 52/223.3 |
| 5,758,796 A | 6/1998 | Nishimura et al. ......... 220/653 |
| 5,806,702 A | 9/1998 | Sabo ......................... 220/4.12 |
| 5,950,860 A | 9/1999 | Kesterman et al. .... 220/4.26 X |
| 6,293,556 B1 * | 9/2001 | Krausz ....................... 277/549 |

\* cited by examiner

*Primary Examiner*—A. Michael Chambers
(74) *Attorney, Agent, or Firm*—Thomas W. Hanson

(57) ABSTRACT

A modular fluid storage tank, intended for underground storage of water, utilizing alternating circular and octagonal ribs in the main body and curved, ribbed, end caps. Interconnection of the tanks uses rigid pipe or semi-flexible hose. The coupling between the pipe and the tank incorporates a fitting, integrally molded into the tank, which extends into the interior of the tank, and a flexible sleeve which fits over, and is clamped to, the fitting and the pipe. The coupling is protected from the environment and is accessible from within the tank after installation for inspection and repair without the need to excavate the tank. The tank preferably has approximately equal length and diameter for improved strength. It is relatively small and lightweight, suitable for transport to and installation at a remote location without heavy equipment.

9 Claims, 16 Drawing Sheets

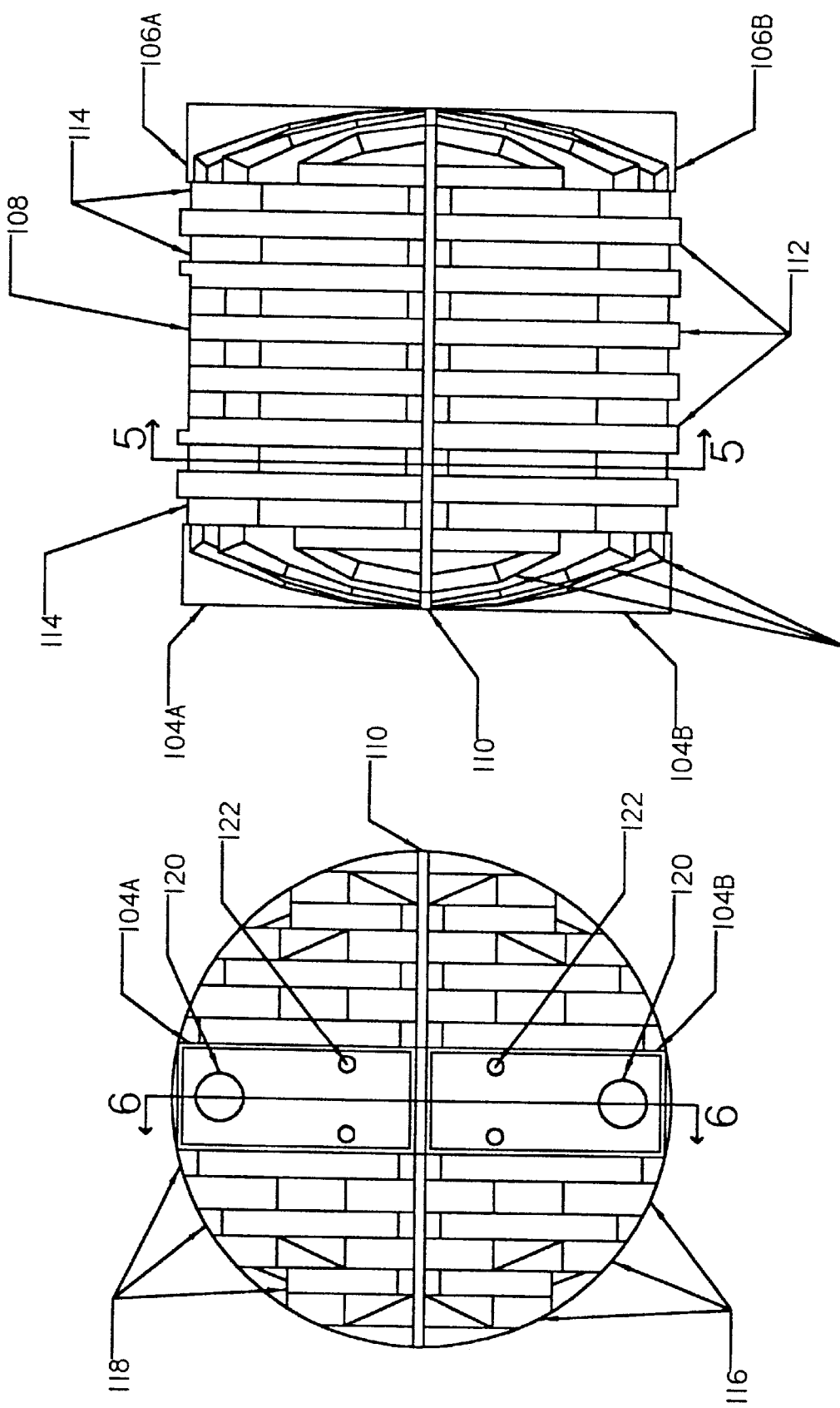

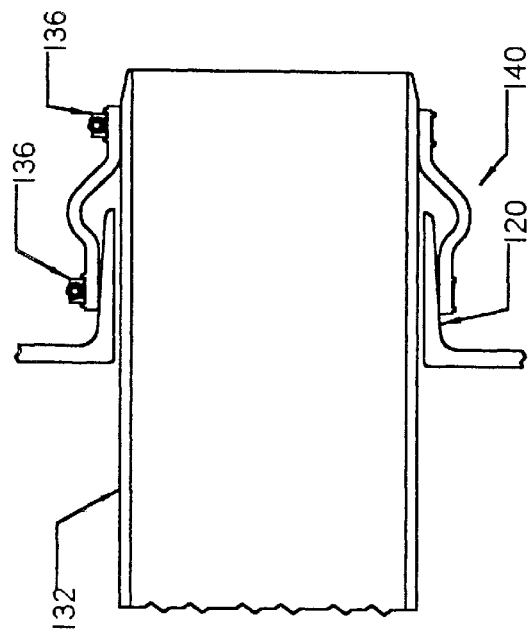
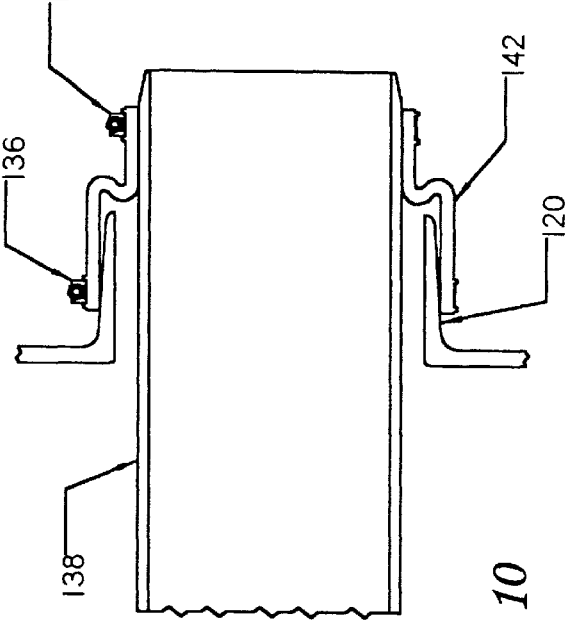
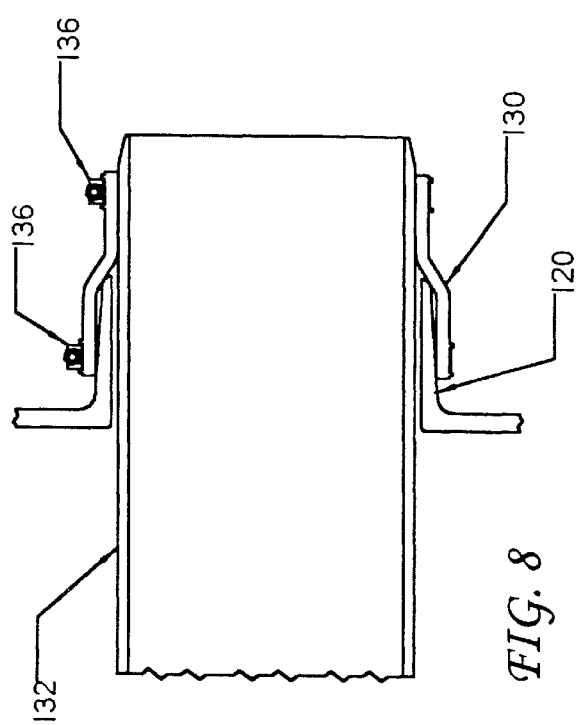
FIG. 8
FIG. 9
FIG. 10

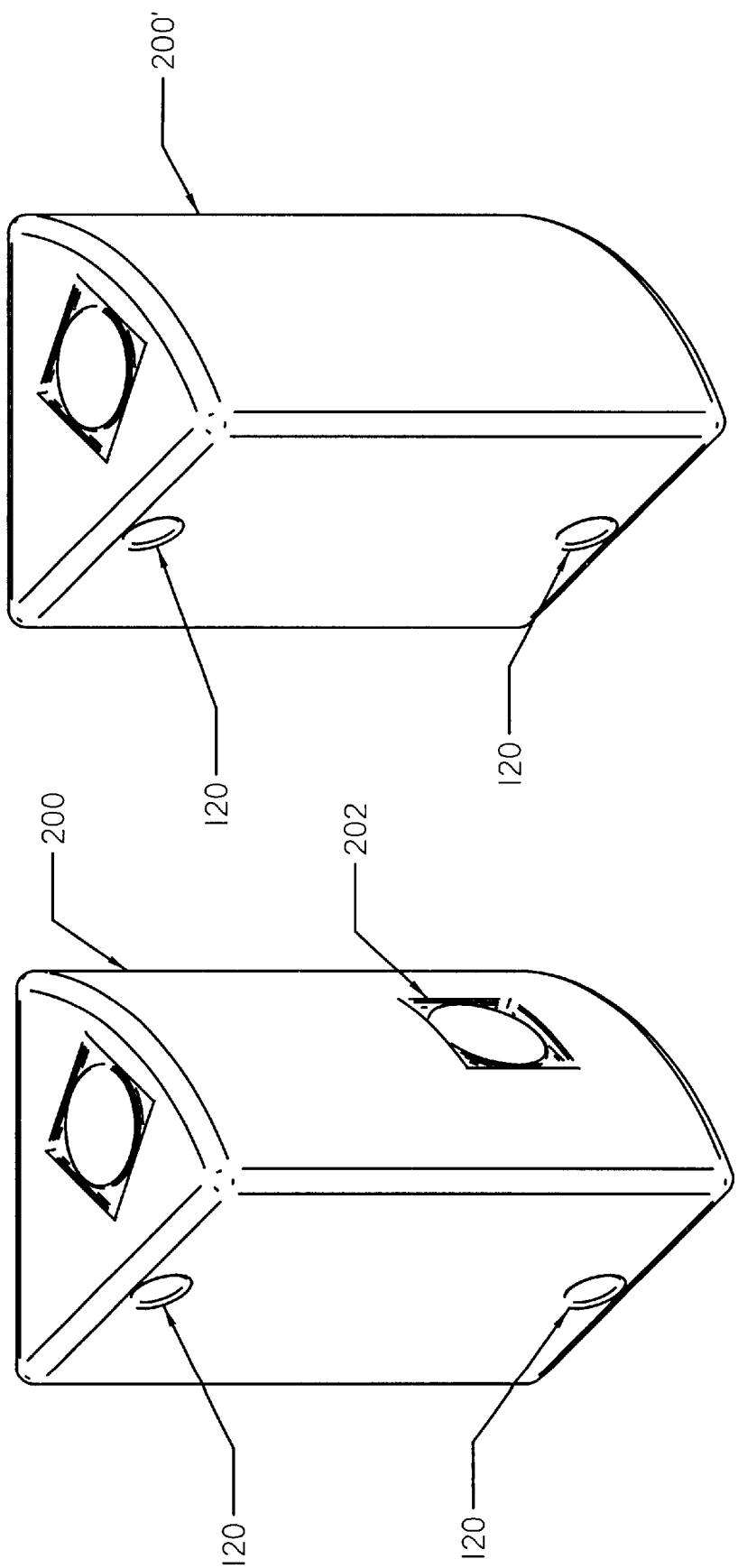

METHOD AND APPARATUS FOR CONSTRUCTING MODULAR FLUID CONTAINMENT TANKS

CROSS-REFERENCE TO RELATED APPLICATIONS (IF ANY)

This application is a continuation-in-part of Application No. 09/296,963, filed Apr. 22, 1999, now U.S. Pat. No. 6,227,396 issued May 8, 2001.

FIELD OF THE INVENTION

The present invention relates to the storage of fluids and in particular to the storage of fluids in a system of modular tanks.

BACKGROUND OF THE INVENTION

The need for storage of water is well known, especially in the west where many regions are arid or semi-arid. Water may be stored for a variety of reasons: potable water for household use; water for livestock; and fire cisterns are some of the more common applications. While open, above ground storage is common for livestock, enclosed storage is preferred for potable water in order to avoid contamination. Where enclosed tanks are used, underground tanks are often preferred. By burying the tank, the tank itself is supported, the tank is protected, and the contents of the tank are insulated from temperature changes. Underground tanks are also commonly used as septic tanks where municipal sewer service is not available.

Various materials have been used to construct underground storage tanks. Steel and concrete have been in use for decades. Fiberglass is a newer material rapidly gaining popularity especially in petroleum storage. Steel tanks are prone to rusting, especially where they are exposed to ground water. Concrete tanks do not rust, but are semi-porous and will deteriorate with time. Fiberglass has good resistance to corrosion, but is relatively brittle, requiring careful handling, especially during installation. A sharp blow or inadvertent contact with the installation equipment can easily damage a fiberglass tank.

Both steel and concrete tanks are relatively heavy. This typically results in the tanks being constructed relatively near the point of installation to reduce transportation difficulties and expense. This weight also effectively limits the maximum size of tank which can be constructed of these materials. Fiberglass is a much lighter material and can be used to fabricate a tank which is relatively rigid for its size. This enables the construction of relatively large, light weight tanks which are efficient to build and transport. However, there must be sufficient room for the necessary equipment, such as a crane, at the job site to off load and install the tank. Additionally, construction of fiberglass tanks is a labor intensive process which makes them relatively expensive.

Polyethylene has several characteristics which make it particularly suitable for potable water storage. It is typically formed into tanks using a rotary molding process which results in a one piece, seamless tank. This limits opportunities for bacterial growth and ground water infiltration. The material is impact resistant, flexing rather than cracking like fiberglass, and is highly corrosion resistant. However, this flexibility results in a vessel which is structurally weaker, limiting the size of the tank which can be cost effectively constructed. Large radiuses and flat surfaces are prone to buckling and collapse when the surrounding ground shifts or freezes, or from external pressure due to ground water.

Where access to the site is restricted, none of the above approaches is ideal. This is a common situation in mountain communities where the terrain limits access. Roads are often narrow and sharply curved. Surfaces may be rough and unimproved, with dirt or gravel being common. However, houses and ranches in these regions are often the ones most in need of water storage because municipal water is unavailable, natural water supplies may not exist, and wells are difficult and expensive to drill and may provide only a minimal flow. In such a situation, a fire cistern may be needed for safety and is often a prerequisite to obtaining fire insurance.

Compounding the problem is the fact that the required storage capacity often exceeds the capacity of any single tank which can be efficiently moved to the site and installed. It thus becomes necessary to interconnect several tanks to form a storage system of sufficient capacity. Several designs for such systems are known. Most common are tanks which couple together with mating pipe flanges. Where the terrain is uneven, achieving the required alignment to allow insertion of all of the bolts which join the flange can be very difficult. If it is achieved, shifting of the tanks due to settling can result in significant stresses in the tanks. The strict alignment requirements can increase the cost of the excavation as it must be matched to the tank, there being little adaptability in the tank. The level of skill required to properly install and join these types of tanks is often not available in remote areas, requiring bringing in skilled labor for the installation. Further, supplies or materials may be required which are not commonly available. If additional items are needed, the project may be delayed while they are brought in.

Where the tank material is polyethylene, manufacturing characteristics of the material introduce additional problems. Uneven cooling of the mold and relative time of release of various portions of the tank from the mold cavity cause warping and distortion in the tank which can vary from one unit to another. While not significant to the performance of the tank, these variations can easily be large enough to make it difficult to align all of the bolts for an interconnecting flange, and nearly impossible to align multiple connections on the face of a tank.

One solution to the alignment problem is to interconnect the tanks with flexible hose or tubing This allows for misalignment between the tanks and eliminates the flange mating problem. However, the joints used for this type of connection are prone to leaking and require periodic inspection and repair, which typically require at least partial excavation. Additionally, the hardware components of the joint are external to the tank and are exposed to the environment and backfill material both during and after installation.

The above discussion is also applicable where above ground storage of water or other fluids is needed. Transport of full size tanks may not be practical and on-site construction difficult.

Vehicle mounted tanks pose a related problem, especially where the tank is not permanently mounted. A tank may be installed and removed with relatively high frequency as needs dictate. Further, where water transport is relatively uncommon it may not be cost effective to dedicate a vehicle to water transport. However, typical tanks are constructed of steel and are difficult to install and remove without specialized equipment such as a crane or high capacity fork lift.

There is a need for a relatively small, lightweight, modular tank, either above ground or buried, which can be transported to the installation site over narrow, unimproved roads using light to medium duty equipment. At the site, it should be possible to easily unload and quickly connect several tanks together to provide a larger storage system. Ideally, the system should provide various configurations which are adaptable to the terrain or needs of the user. Alignment between the various modules must not be critical. It should be possible to install and connect the modules using unskilled labor and materials which are commonly available in rural areas. Ideally, it should be possible to periodically inspect, and if necessary repair, the inter-tank connections after installation of the system without excavation. There is also a need for a similar modular system of constructing vehicle mounted tanks for transporting fluids, where the individual modules are easily installed and removed, preferably by one person with minimal equipment.

SUMMARY OF THE INVENTION

The present invention is directed to an apparatus for the storage of liquids, primarily water, in an underground tank. The tank is adapted for use as a module in a larger storage system comprised of multiple tanks.

According to the invention there is provided a tank with a ribbed main body and curved end caps and at least one fitting which extends inward into the cavity of the tank. The ribs alternate between outward circular ribs, and inward octagonal ribs. Where the tanks will be positioned immediately adjacent to each other, the tank can be manufacture with a flat panel on each end and the fitting positioned within the panel. The fitting is initially formed as a fluid tight, integrally molded cup and the end of the cup is cut out when needed to connect to a pipe.

According to an aspect of the invention, the shape of the tank is that of a modified sphere, with the diameter and length of the tank being substantially the same.

According to another aspect of the invention, a lengthwise rib may be added to further stiffen the structure or the rib may encircle the tank along a lengthwise circumference.

Further in accordance with the invention, one or more alignment cups may be formed in the ends which accept short pipe segments for aligning adjacent tanks.

Still further in accordance with the invention, one or more spreader tubes may be positioned within the tank, pushing outward on the ends for increased strength.

Yet further in accordance with the invention, the tanks may be configured into a system of tanks, interconnected by pipes, the pipes coupling to the tanks by means of a flexible sleeve and band clamps. The sleeve and clamps are positioned within cavity of the tank. The sleeve may be of various forms or materials as necessary to provide the required amount of flexibility in the joint. If desired, the pipe may have a smaller diameter than the fitting, increasing the tolerance for angular deflection.

The advantages of such an apparatus are a tank which is relatively small and lightweight, and easily transported to remote sites. There, the tanks can be combined into a storage system of almost unlimited capacity. The tanks may be laid out in any configuration or orientation required to adapt to the local terrain. Interconnection of the tanks is achieved with simple readily available materials and can be performed by relatively unskilled labor. The joints are within the tanks, protected from the environment and readily accessible after installation for inspection or repair without excavation.

The above and other features and advantages of the present invention will become more clear from the detailed description of a specific illustrative embodiment thereof, presented below in conjunction with the accompanying drawings.

BRIEF DESCRIPTION OF THE DRAWINGS

FIG. 3 provides an end view of tank

FIG. 4 provides a side view of tank

FIG. 8 is a cross section through the coupling illustrating the standard flared sleeve.

FIG. 9 is a cross section through the coupling illustrating the alternative humped sleeve.

FIG. 10 is a cross section through the coupling illustrating the alternative S-curve sleeve.

FIG. 15 illustrates a single wedge shaped module with two access hatches.

FIG. 16 illustrates a wedge module with a single access hatch.

DETAILED DESCRIPTION OF THE INVENTION

The following discussion focuses on the preferred embodiment of the invention, in which an underground modular storage tank for potable water is presented. However, as will be recognized by those skilled in the art, the disclosed apparatus is applicable to a wide variety of situations in which modular storage of fluids is desired. The preferred form is directly applicable to septic systems. With appropriate changes to the materials, the designs and techniques presented are also applicable to petroleum and chemical storage. While the preferred installation method is to bury the tank, it may also be installed partially exposed.

The following is a brief glossary of terms used herein. The supplied definitions are applicable throughout this specification and the claims unless the term is clearly used in another manner.

Alignment cup—one or more relatively small depressions molded into the ends of the tank used primarily for aligning adjacent tanks. Also usable as fluid connections if desired.

Band clamps—generally any type of compressive clamp usable around the circumference of a generally round object to contract around that object providing an inward force. One form of these, in relatively small diameters, are often referred to as hose clamps.

Connection cup—relatively large fitting molded into the ends of the tank used primarily for providing a fluid connection to the tank. Also usable for alignment if desired.

Cup—in the present invention any of the various cup-shaped fittings molded into the end of the tank for use as a fluid connection, for alignment purposes, or both.

Cuff—the projecting edges of a connection cup to which the sleeve is clamped.

Pipe—herein, generally any elongated, hollow member capable of transmitting fluids. Unless specifically restricted by context, this term is intended to include both pipe and tubing whether rigid or flexible and of any material.

Sleeve—generally any flexible elastomeric coupling for joining two sections of pipe or tubing. May also be referred to in the trade as a boot.

Preferred Embodiment

The disclosed invention is described below with reference to the accompanying figures in which like reference numbers designate like parts.

Figure 1:
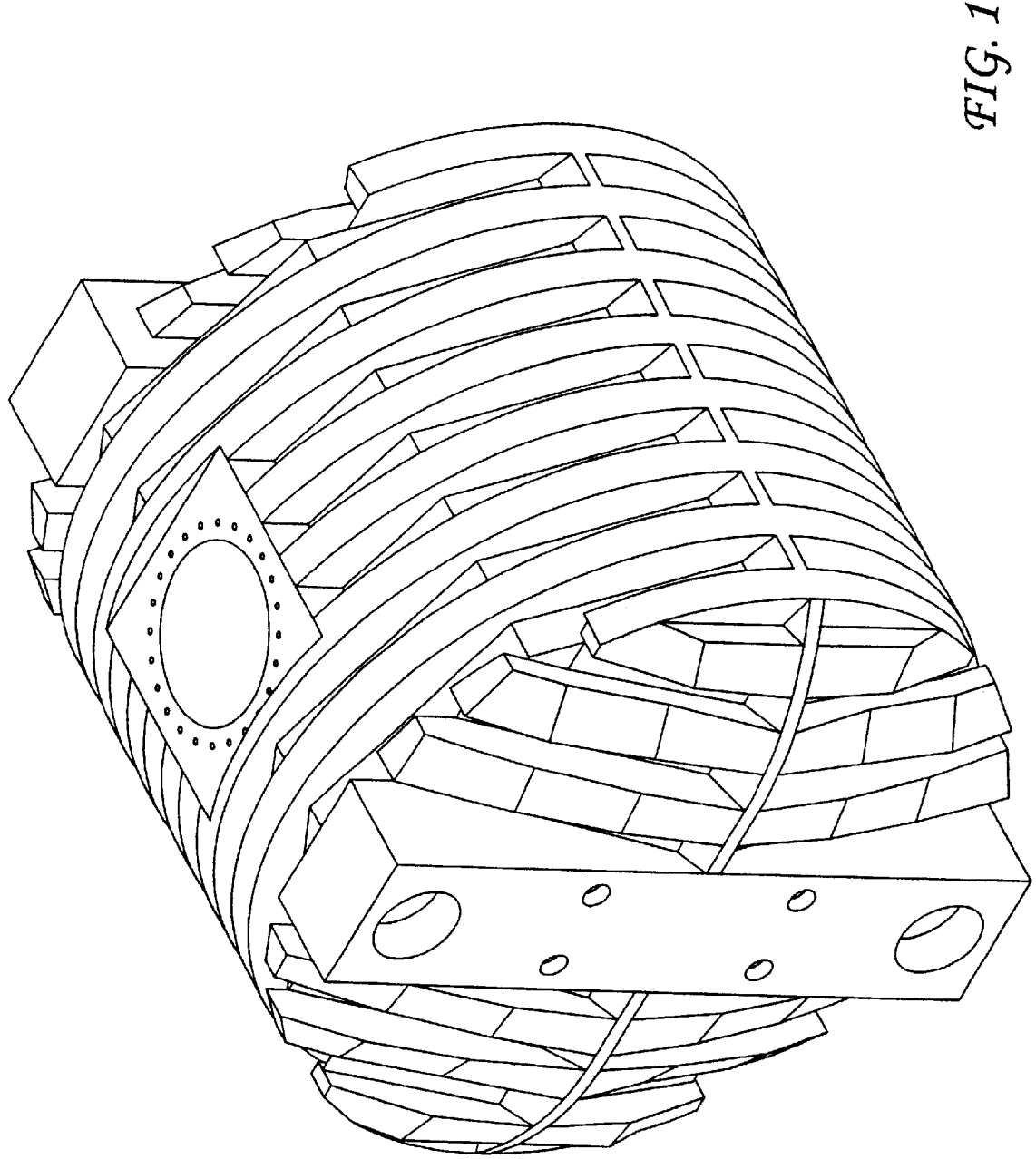
FIG. 1 provides a perspective view of the tank.

FIG. 1 provides an external isometric view of the inventive tank showing the relative positioning of the major components and an overview of the entire structure. The individual elements will be discussed below with reference to the other figures which provide more detailed views.

Figure 2:
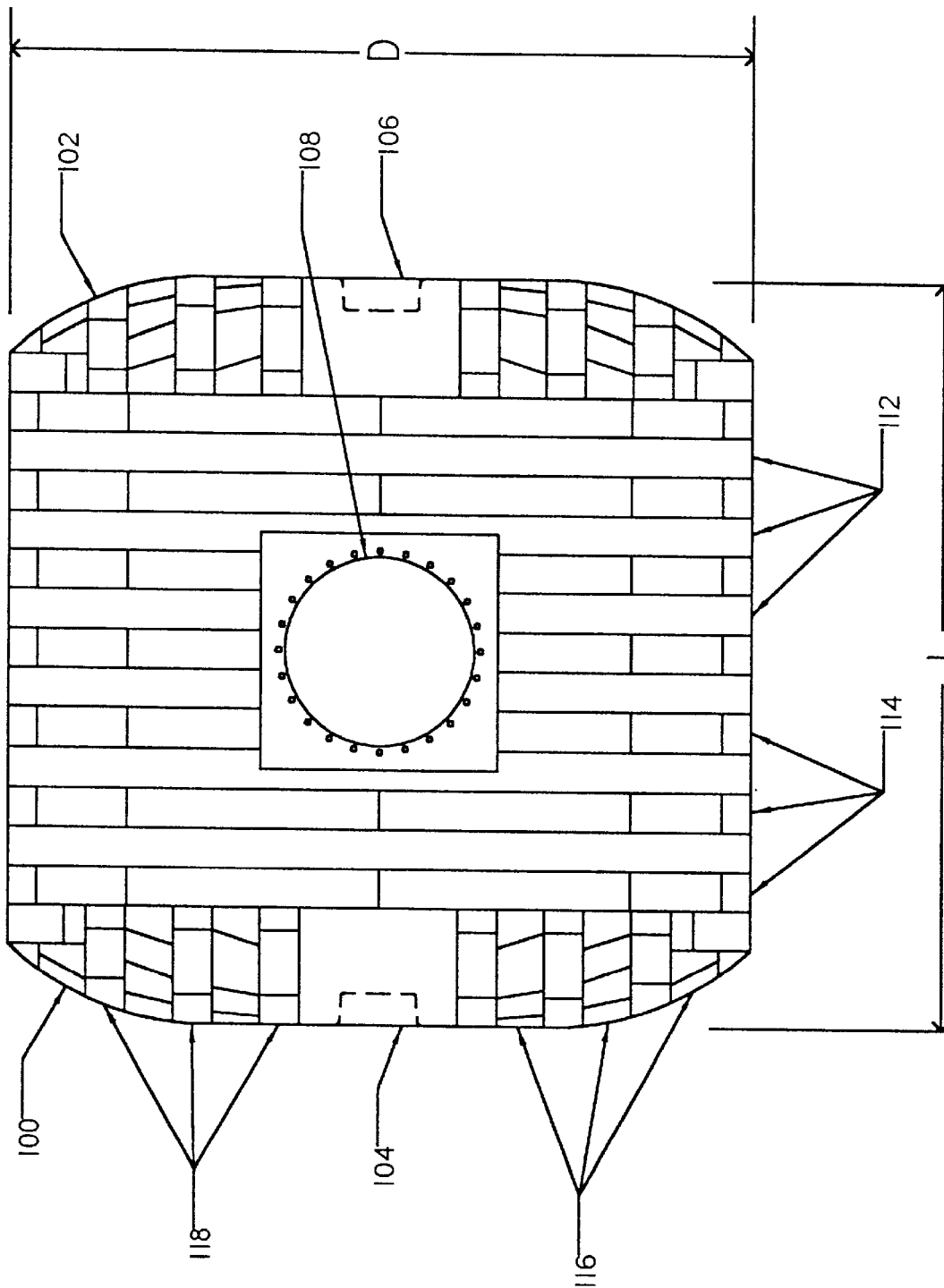
FIG. 2 provides a top view of the tank

With reference to FIG. 2, it can be seen that the overall structure of the tank is that of a modified sphere. While roughly cylindrical in shape, the ends, 100 and 102, are substantially curved and the diameter, D, is approximately equal to the length, L. The curve of the ends is interrupted only by the end plates, 104 and 106, which are made flat to enable a flush interface between two adjacent tanks. Where interconnection of tanks is not anticipated, or where such interconnection will not be flush, the ends may be manufactured with a continuous curve.

The modified spherical form has been found to be stronger than a conventional cylinder both in field tests and in vacuum tests where the tank is evacuated to various levels. Such vacuum tests were performed with the tank above ground and exposed to normal atmospheric pressure. Preferably the length and diameter will be within 5% of each other although differences of 15% have exhibited acceptable performance. Additional crush resistance is gained when the flat portions of the ends are braced with spreader tubes as described below.

The access opening, 108, provides ingress and egress for the tank. As with all of the openings, it is molded into the tank as a sealed surface with the opening appearing as a depressed area. If needed, this area is cut out, forming the opening. Where a single tank is to be used, eliminating the need to access the inside of the tank, the opening may remain sealed. In the preferred embodiment, this area is also used to place the vent which extends into the tank during the molding process.

With reference to FIGS. 3 & 4, the details of the external structure of the inventive tank can be seen. The main body of the tank is formed from alternating outwardly, 112, and inwardly, 114, projecting ribs. These are discussed in more detail below. In a similar manner the ends of the tank comprise alternating ribs, 116, and troughs, 118. In the preferred embodiment, both ribs and troughs are formed from a series of flat plates. Alternatively, each of these could be formed as a continuous curved surface. Centered on each end are end plates, 104 and 106, made up of two sections, 104A, 104B and 106A, 106B, containing cups, 120 and 122. The mold separation line, 110, has been enlarged and adapted to form a structural component of the tank. Of triangular cross section, see FIG. 5, this line forms an equatorial rib extending around the circumference of the tank at the midpoint. This rib significantly strengthens the tank, resisting expansion and contraction along the length of the tank. Without this member, the ribs would freely accordion allowing the tank to expand and contract. An alternative embodiment of the tank includes a similar rib at the top and bottom of the tank extending along the centerline from end to end (interrupted by the access opening on the top). If desired, additional ribs could be added, spaced around the circumference of the tank, to further increase the rigidity. However, it has been found that some ability to expand and contract is desirable. An additional feature of the bottom rib would be to allow flow of water between the main ribs, preventing trapped water.

Figures 5, 6:
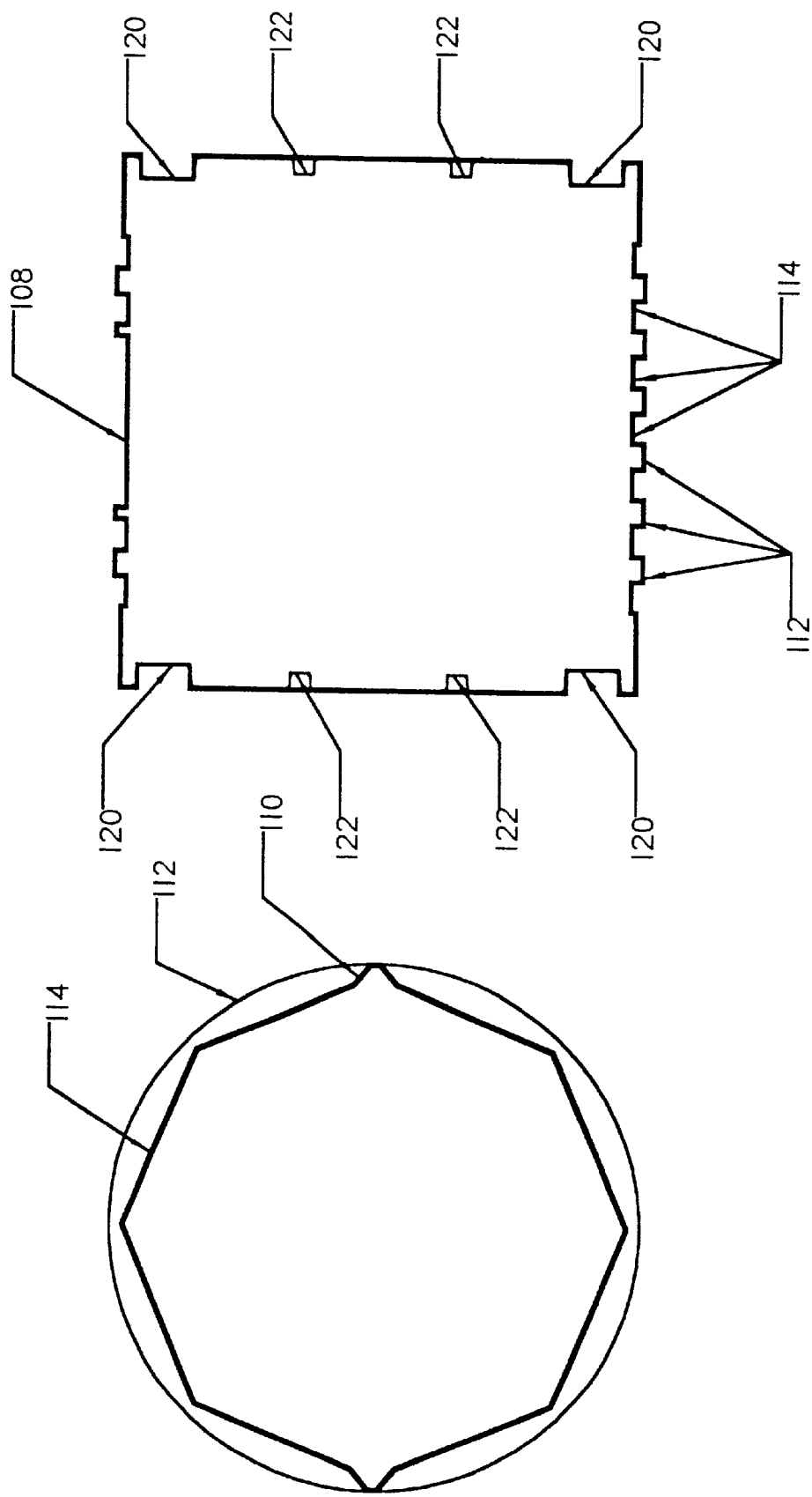
FIG. 5 is a cross section through the diameter of the tank illustrating the rib structure.
FIG. 6 is a cross section through the length of the tank.

With reference to FIG. 5, the structure of the ribs can be seen in more detail. The outwardly extending ribs, 112, are of conventional circular cross section. The inwardly extending ribs, 114, are of an octagonal cross section forming an eight sided structurally balanced matrix. This combination of circular and octagonal ribs has been found to provide structural advantages as compared to using only circular ribs. Other numbers of flat segments could be used, such as a hexagon. The triangular cross section of the side rib, 110, can be clearly seen. The alternating pattern of the inward and outward ribs can be seen in FIG. 6.

The cross section of FIG. 6 illustrates the positioning of the various potential openings provided for in the tank design. Connection cups, 120, are intended for use as the primary fluid passage openings provided in the tank. There are four total, at the upper and lower limits of each end of the tank. When the tank is manufactured, each opening is formed as a closed cup, integral with the rest of the tank. This provides a seamless, airtight seal for any openings which are unused. When an opening is to be used, the inner face is cut out, preferably by cutting parallel to, and flush with, the inner surface of the opening, leaving a circular cuff projecting into the interior of the tank. In a similar manner, the alignment cups, 122, can be utilized for smaller capacity connections. Various patterns of openings and connections can be supported by changing the end plate pattern in the mold. In the preferred embodiment, all four end plates are identical, providing connections which are symmetrical about all three major axes of the tank. If desired, any combination can be achieved including having each plate different. The symmetry provided by the preferred embodiment has been found desirable where multiple tanks are to be joined together into a larger system.

Figure 7:
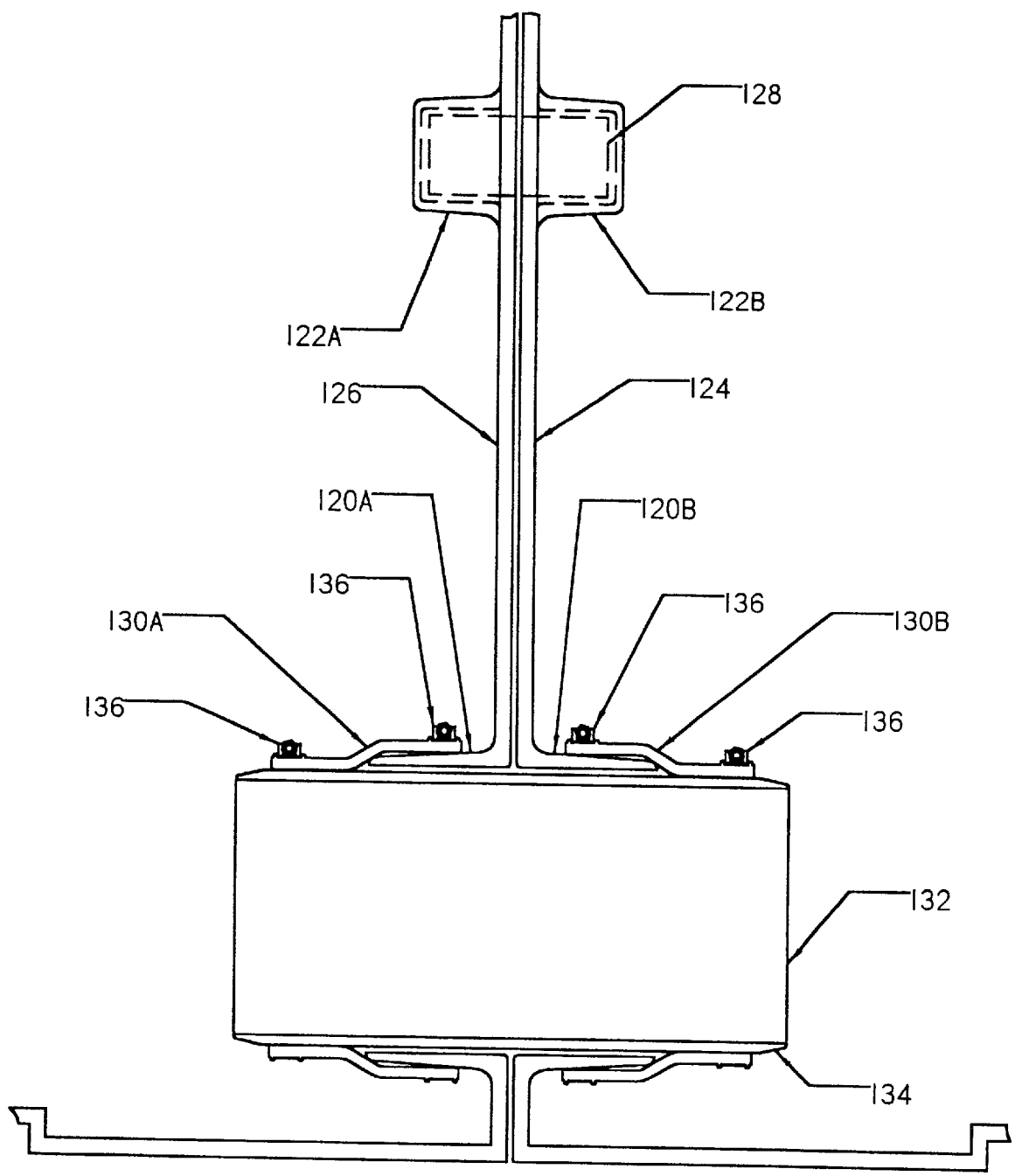
FIG. 7 provides a detailed view of the coupling between two tanks, along the same line as the cross section of FIG. 6.

FIG. 7 provides a detailed view of the coupling between two tanks, 124 and 126, which are positioned flush together. The tanks are positioned with their openings, 120A and 120B, aligned. If not already done, the end faces of these connection cups are cut out to form through openings. A length of suitable pipe, 132, is inserted through the openings so that it extends slightly into the interior of each tank. While a minimum length must be provided to form a good seal with the sleeves, significant excess length is not a problem, simplifying the installation. While not required, a slight taper, 134, on the outer edge of the ends eases installation of the sleeves. The sleeves, 130A and 130B, are slipped over the ends of the pipe and positioned to overlap both the cuff of the openings and the pipe, in contact with the outer circumference of each. Band clamps, 136, are then positioned near each end of both sleeves and tightened to form a watertight seal between the sleeve and the pipe, or opening, as appropriate. With the sleeve positioned on the inside of the tank, hydrostatic pressure from the contained water, or other fluid, serves to tighten the seal since the pressure forces the sleeve into tighter contact with the cuff of the opening and the pipe. This is in contrast to the conventional arrangement with the connection on the outside of the tank where hydraulic pressure is pushing the flexible coupling outward, expanding it away from its contact surfaces. In some situations, the band clamps may be unnecessary, the hydrostatic pressure, possibly in combination with an adhesive, being sufficient to hold the seals in place.

With the joint formed in this manner, there is no need for an opening or gap between the ends of the adjacent tanks. The tank surfaces can be in contact right up to the edge of the opening, around the full circumference of the pipe.

In the preferred embodiment, the inside diameter of the opening, 120, is slightly larger than the outside diameter of the pipe, 132. This allows for slight angular movement of the pipe relative to the centerline of the opening. This also allows for a certain amount of relative movement between two adjacent tanks which are interconnected. Such movement might occur during installation, as the fill settles, or as the surrounding soil shifts due to freeze-thaw cycles.

It should be noted that all work involved in sealing the connection takes place from within one or the other of the tanks. Once the tanks are properly installed and aligned, there is no need for access to the outside of the tank. If desired, the tanks may be immediately backfilled, partially or fully, without delaying for the installation of the sealing sleeves. The sleeve and band clamps are protected from the outside environment by the tank. While exposed to the contents of the tank, they are not exposed to ground water, fill material, or to possible damage by workers tools as the fill is positioned and compacted. The internal positioning of the joint also simplifies inspection and repair of the joint after the tank is put into use. Rather than excavating the tank, it is merely drained to a level below the joint in question allowing the clamps and/or sleeves to be inspected or replaced.

Minimal skill is required to properly install the components of the connection. The pipe must be cut to length and inserted; the sleeves slipped into place; and the band clamps positioned and tightened. These steps can be easily performed by unskilled labor. This contrasts with a flanged connection between metal, or possible concrete, tanks which require a great deal of skill and could require the services of a pipefitter. Where the installation is in a remote rural area, skilled labor may not be readily available. The ability to install the tanks with unskilled labor greatly decreases the cost of a project and may decrease the time required.

The materials used in making the connection are also common, likely to be available in a rural area. While the sleeve is somewhat special, the embodiment illustrated in FIG. 7 is a commercially available part. The pipe and band clamps are used for a variety of purposes and are widely available. This availability of parts means that if a part is misplaced or damaged, it may be possible to replace it at the nearest agricultural implement dealer or building supply center, rather than shipping in a part from a large city or even the manufacturer. This may mean the difference between finishing that day or finishing 3 to 5 days later.

The method of interconnecting the tanks also enables a method of repair which is not typically available. If one of the interconnecting pipes develops a crack or is damaged, as might occur if the soil freezes or water in the pipe freezes, it can be repaired without excavating the tanks. From within the affected tanks, the sleeves, 130 A & B, are removed and the pipe, 132, trimmed approximately flush with the end of the internal tank cuff, 120 A & B. A pipe of slightly smaller diameter is then inserted through the original pipe, extending beyond the openings as before. A new sleeve, with a smaller minor end, is then fitted which connects the cuff to the newly inserted pipe. While the flow capacity of the connection is somewhat reduced, the entire repair is performed without excavation and in the matter of minutes after the tanks are drained.

FIG. 7 also illustrates the functioning of the alignment cups, 122 A & B. These cups are sized to accept a short length of standard size PVC pipe, 128. In the preferred embodiment, 3 inch diameter pipe is used. A pipe section of the appropriate size is cut for each opposing pair of alignment caps with length which is slightly less than twice the depth of an individual alignment cup. This allows the pipe to reach fully from end to end of two adjacent cups, with a slight gap to prevent binding. As the second of two adjacent tanks is being installed, the pipe sections are inserted into the cups of one of the tanks. As the second tank is brought into alignment with the first tank, the pipe sections will slip into the alignment cups on the second tank, fixing the two tanks in position relative to each other. Because the pipe is not a tight fit into the cup, a certain amount of relative movement can occur to accommodate minor misalignment of the tanks. This looseness also accommodates tank-to-tank variations inherent in the manufacturing process. The tightness of this fit can be adjusted during manufacture to regulate the amount of movement allowed. In the preferred embodiment, the diameter of the cups is approximately ⅛th inch larger than the pipe for a 3 inch pipe.

Alternatively, where spreader tubes are not used, the alignment cups may also be used for low volume fluid connections between the tanks, as might be needed for septic tanks. The cups are made in the same manner as the large fluid connection cup, 120, and a connection can be made in the same manner using smaller diameter pipe, sleeves and clamps. Similarly, the large fluid connection, 120, can also be used for alignment. A short section of the appropriate diameter pipe can be inserted into the large openings in the same manner as the alignment cups are used. The openings may be left closed and cut open after installation and the pipe section removed, or they may be cut open and a longer length of pipe, even the one to be used for the fluid connection, can be used for alignment.

FIGS. 8, 9, and 10 illustrate alternative embodiments of the elastomeric sealing sleeve which can be used. Other forms are also anticipated. FIG. 8 shows the simplest form of the sleeve, 130, in Which the sleeve transitions from one diameter to the other. This sleeve provides a good seal, but only limited movement of the pipe. This amount of movement is probably sufficient for most installations and this embodiment has the advantage of being commercially available. FIG. 9 illustrates a humped form of the sleeve, 140. The hump increases the flexibility of the sleeve, increasing both the angular and longitudinal range of movement which can be tolerated. This form may have to be custom manufactured. FIG. 10 illustrates the embodiment of the sleeve, 142, which has the greatest range of movement. The S-curve can tolerate a significant amount of longitudinal movement as well as angular movement. Typically, this form would be combined with a somewhat smaller diameter pipe, 138, both to accommodate the S-curve and to take advantage of it. By reducing the diameter of the pipe, the amount of angular deflection until the pipe contacts the circumference of the opening is substantially increased. A ratio of 75% to 90% between the pipe outer diameter and the cuff inner diameter have been found to provide good performance. Angular deflections of 5 to 10 degrees between the pipe and the centerline of the opening can be easily accommodated by this design. (In contrast to the use of the flared boot and normal size pipe which provides for approximately 3 degree deflections.) This is the best combination where significant movement is anticipated. This form of sleeve may also have to be custom manufactured. A further advantage of this design over the humped design of FIG. 9 is that it is easier to manufacture using standard injection molding tooling. This form can be generated using a simple internal plug to form the inside of the sleeve, whereas the humped version would require a contracting plug or a two-piece, separable outer die, which increases both cost and cycle time.

Figure 11:
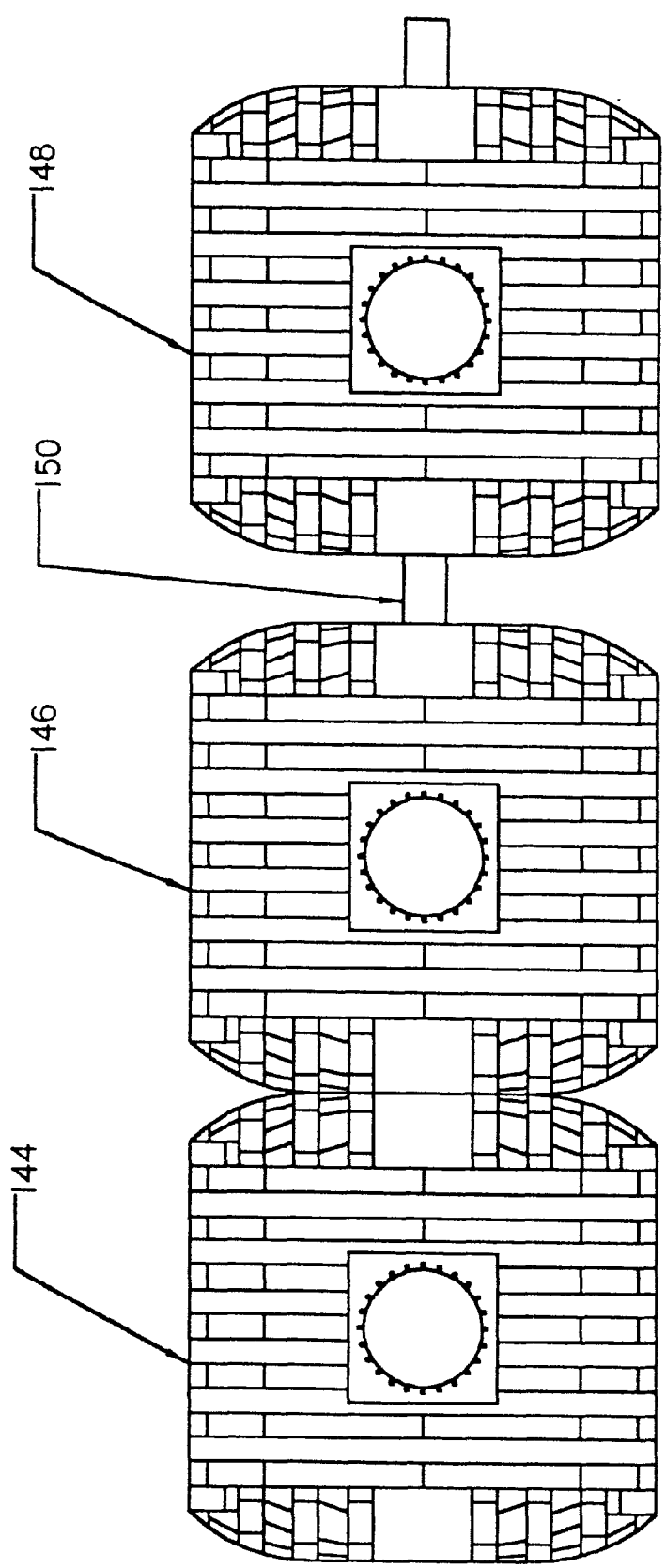
FIG. 11 illustrates one possible configuration of multiple tanks as a storage system.

FIG. 11 illustrates one of many possible configuration options for combining several tanks as modules in a larger system. In the preferred embodiment, each tank holds approximately 2000 gallons. A system of almost any size can be built, in nominal increments of 2000 gallons by interconnecting tanks. In the illustration, tanks 144 and 146 have been installed with their adjoining faces flush. This is the preferred installation method for most cases since it minimizes the pipe length (maximizing the flow, and minimizing the cost) and minimizes the size of excavation required. Tanks 146 and 148 have been installed with an intervening gap and a longer interconnect pipe, 150. This simple alternative increases the installation options and can reduce cost. As an example, if a rock outcropping intrudes into the excavation, it may be possible to offset the tanks to either side of the outcropping and avoid the necessity of attempting to break out the rock. Where a single large tank is used, this option is unavailable.

Figure 12:
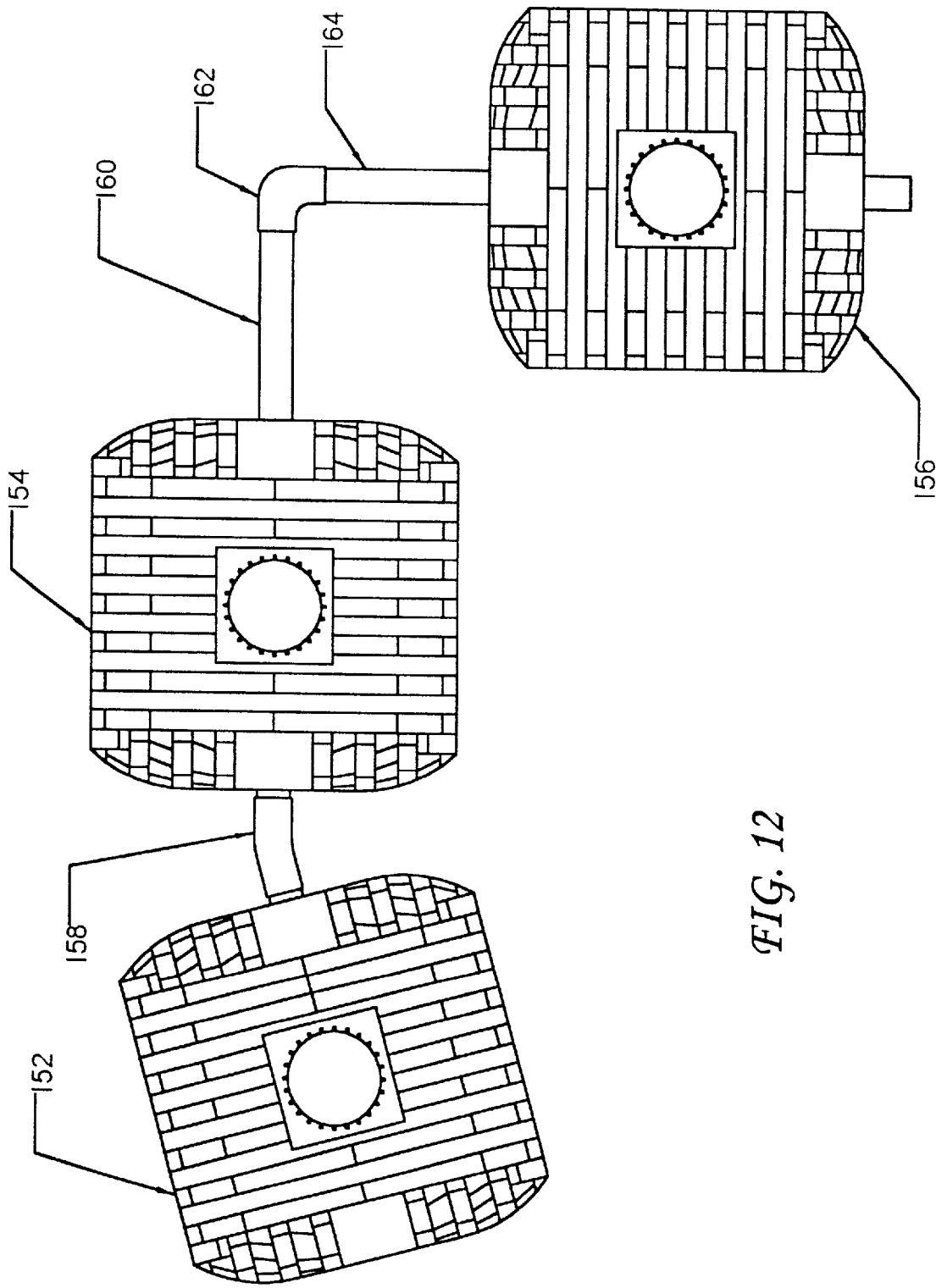
FIG. 12 illustrates a second possible configuration of multiple tanks as a storage system.

Further alignment options are illustrated in FIG. 12. There is no requirement that the connections between two tanks be straight. Tanks 152 and 154 are illustrated as being installed at an angle, using either conventional or custom pipe couplings. This would be desirable to avoid a rock outcropping, as above, or to allow the excavation to follow the contour of a hillside. More radical relative angles are also possible as between tank 154 and 156. It is also possible to configure tanks in square or rectangular arrangements with two or more parallel rows. The tanks may then be interconnected as a single sequential system, where the pipes snake between the rows; as parallel subsystems which then merge into a single output; or as multiple separate systems placed in a single excavation. Other configurations are clearly possible, such as cascaded subsystems.

The preferred material for the interconnect pipe is common PVC. It is relatively rigid, easily worked, and widely available. However almost any form of tubing or semirigid hose can be used. The use of flexible hose provides for a continuous range of angles between the tanks, greater vertical or horizontal displacement between the tanks and will tolerate significant relative movement between the tanks after installation. Note that where the pipe length required is greater than the interior length of the tank, the pipe will have to be inserted into at least one of the tanks prior to placing the next tank. Where the distance is less than this, both tanks may be placed and the pipe passed into one tank through the access hatch.

Figures 13, 14:
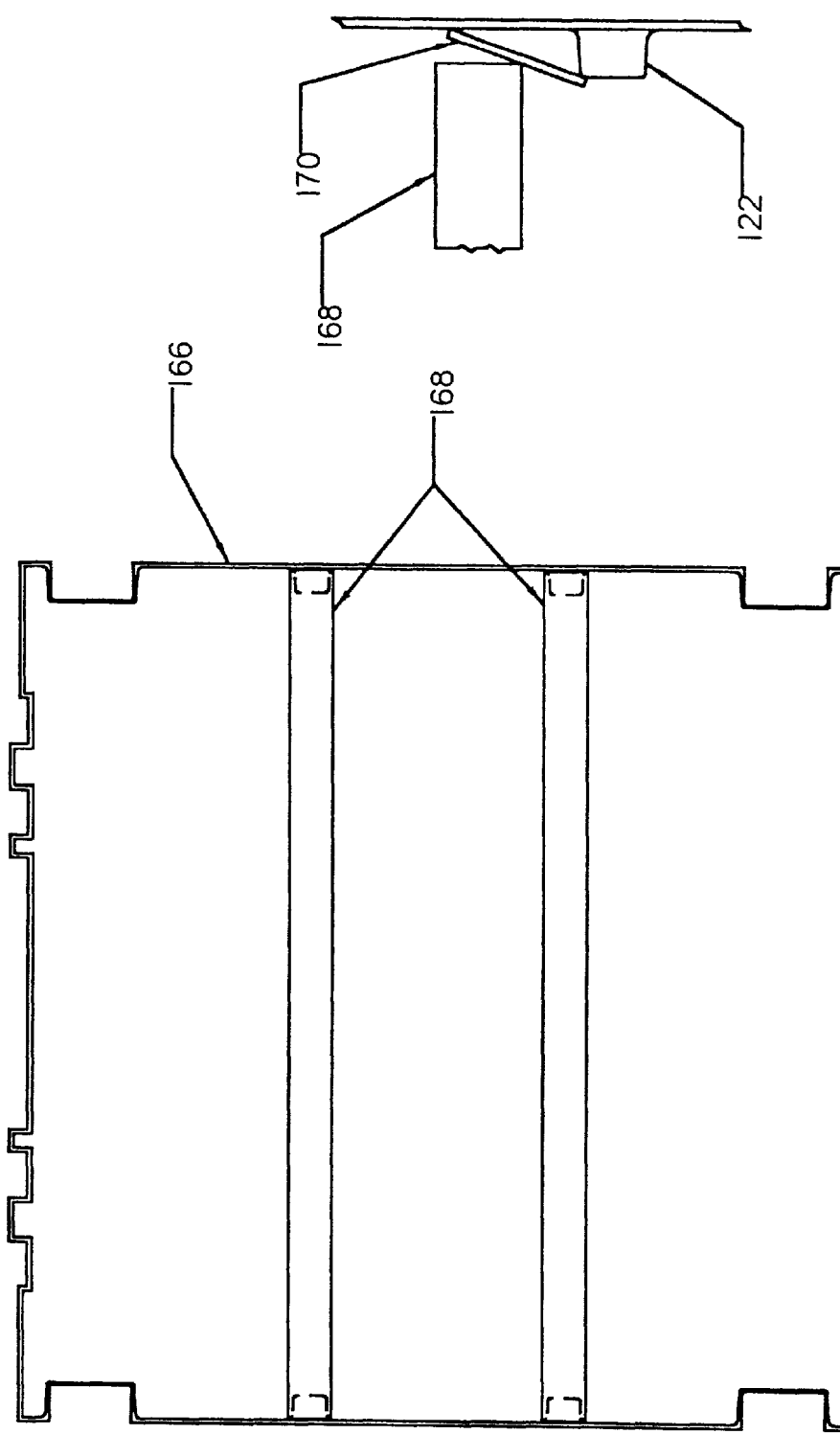
FIG. 13 is a cross section the length of an alternative embodiment of the tank utilizing spreader tubes.
FIG. 14 is a detail view illustrating the installation of a spreader tube over an alignment cup.

In a typical installation, the tank exhibits good strength and structural rigidity. The modified sphere resists uniform external loads as would be exerted by the surrounding fill. This is assisted by the internal hydraulic pressure of the stored water. However, if the tank is left empty for extended periods, while the surrounding soil is shifting, the tank may deform slightly. An example of such a situation is where a potable water storage tank is drained over the winter, either to avoid freezing or stagnation, and the soil experiences multiple freeze-thaw cycles. The portions of the tank most prone to deformation are the flat ends, where the end does not abut an immediately adjacent tank. An alternative embodiment of the tank, shown in FIG. 13, addresses this problem. Spreader tubes, 168, are installed to hold the ends uniformly apart. The preferred embodiment is to use lengths of PVC pipe of the correct diameter to fit snugly over the internal profile of the alignment cups. Note that this diameter will be larger than for the pipe sections used for external alignment. The pipes are preferably cut to the same length as the interior of the tank providing a snug fit with the spreaders captured by the alignment cups. Alternatively, the spreaders could be cut slightly longer than the interior of the tank, resulting in the end being slightly bowed. The spreaders are installed as shown in FIG. 14. One end of the pipe, 168, is placed over an alignment cup and the opposite end is positioned near the corresponding cup at the other end. A ramp plate, 170, forms an incline from the wall of the tank to the top of the cup, 122. The pipe is then forced toward the cup, riding up the ramp, and dropping over the alignment cup. While this process is preferably performed at the factory, it can also be done in the field.

The present invention also has application to other types of modular systems including above ground storage and vehicle mounted tanks. FIGS. 15–19 illustrate a modular tank system utilizing wedge shaped module, 200 and 200', the only difference being the access hatch, 202. These modules incorporate the same connection cups, 120, as described above for both alignment and fluid interconnection between the modules. The hatches may be molded in openings or merely planks which can be cut out as needed.

Figure 17:
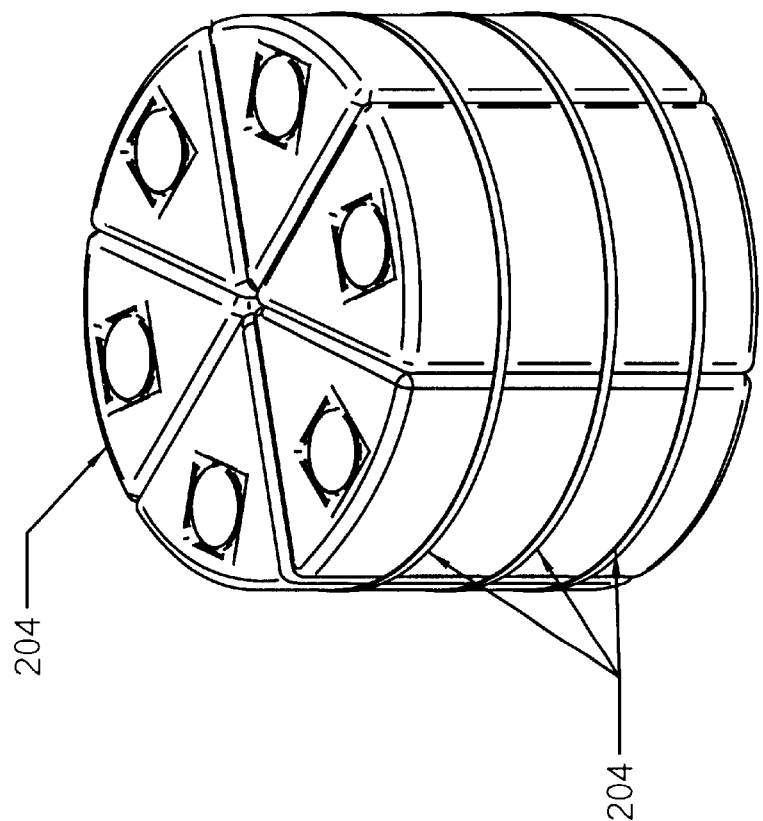
FIG. 17 shows a circular tank assembled from wedge shaped modules.

In FIG. 17 a set of wedge modules has been assembled into a circular tank, held together by circumferential bands, or straps, 208. In this configuration, it would be typical to provide both upper and lower fluid connections between all of the modules, providing a circular flow path throughout the tank. However, it would also be possible to use each module for a different fluid or to connect them in subsets to handle multiple fluids while still taking advantage of the strength of the circular configuration.

Figure 18:
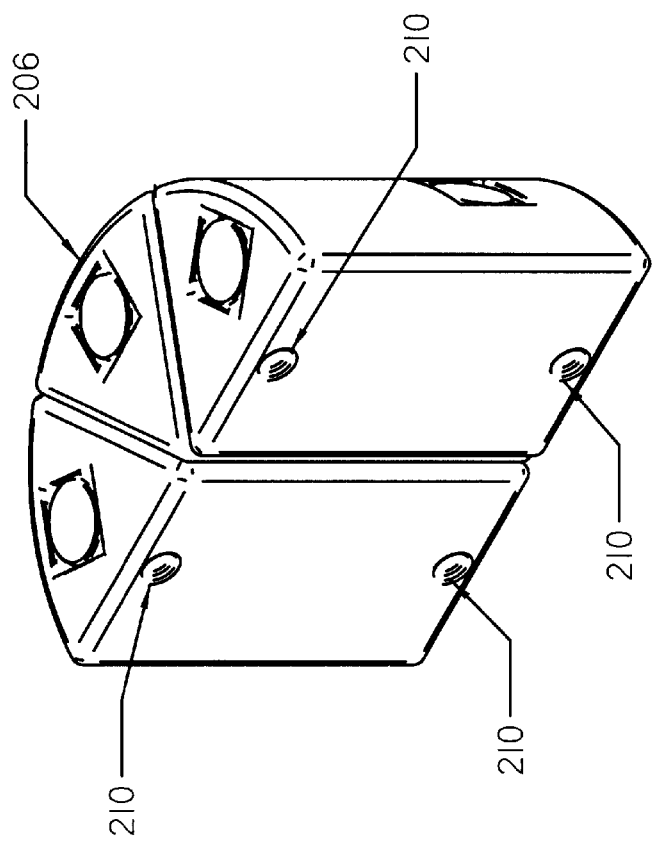
FIG. 18 show a semi-circular tank assembly.

If desired, the wedge modules can also be assembled into a configuration other than circular. In FIG. 18, a semicircular tank, 206, has been created. This configuration lends itself to placement against a flat surface such as the wall of a structure or in the bed of a truck adjacent the cab. Note that no band is utilized in this situation, although it would be possible. The tanks are either free standing or joined by other means. Where the modules are interconnected for fluid transfer, that connection also provides a structural connection. Other configurations are clearly possible, such as alternating the direction of the tanks for provide a substantially linear arrangement.

Figure 19:
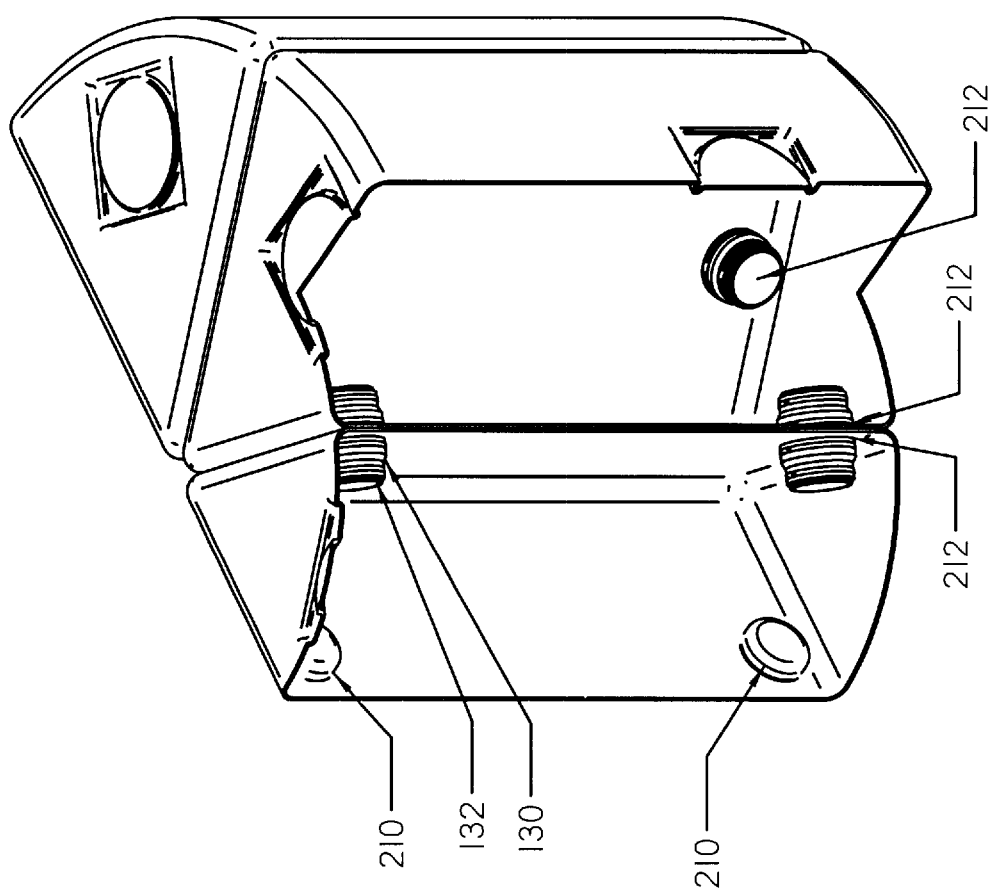
FIG. 19 provides a cross section through the assembly of FIG. 18 illustrate the interconnection of the modules.
Figure 20:
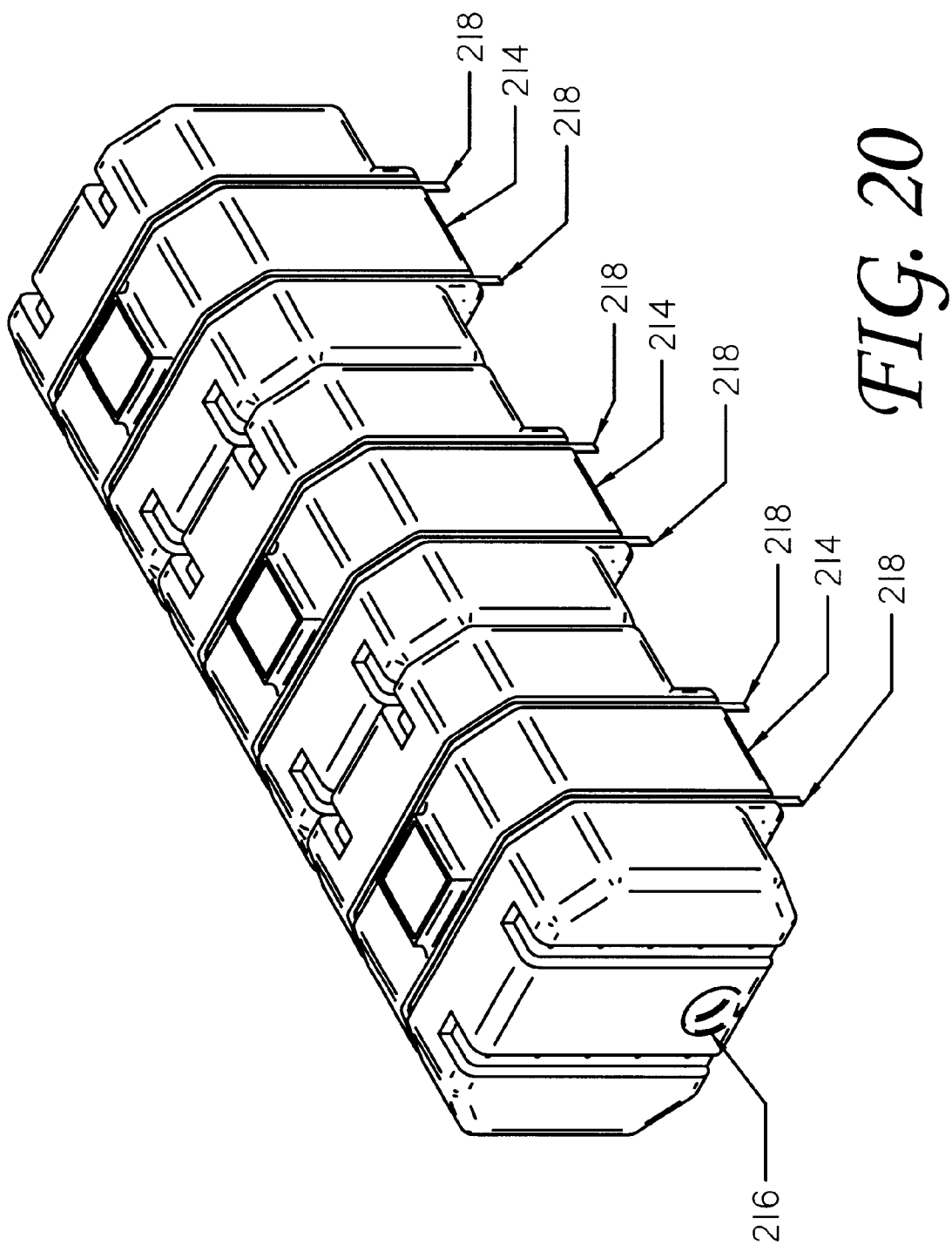
FIG. 20 illustrates a vehicle mounted tank assembled from interconnected modules.
Figure 21:
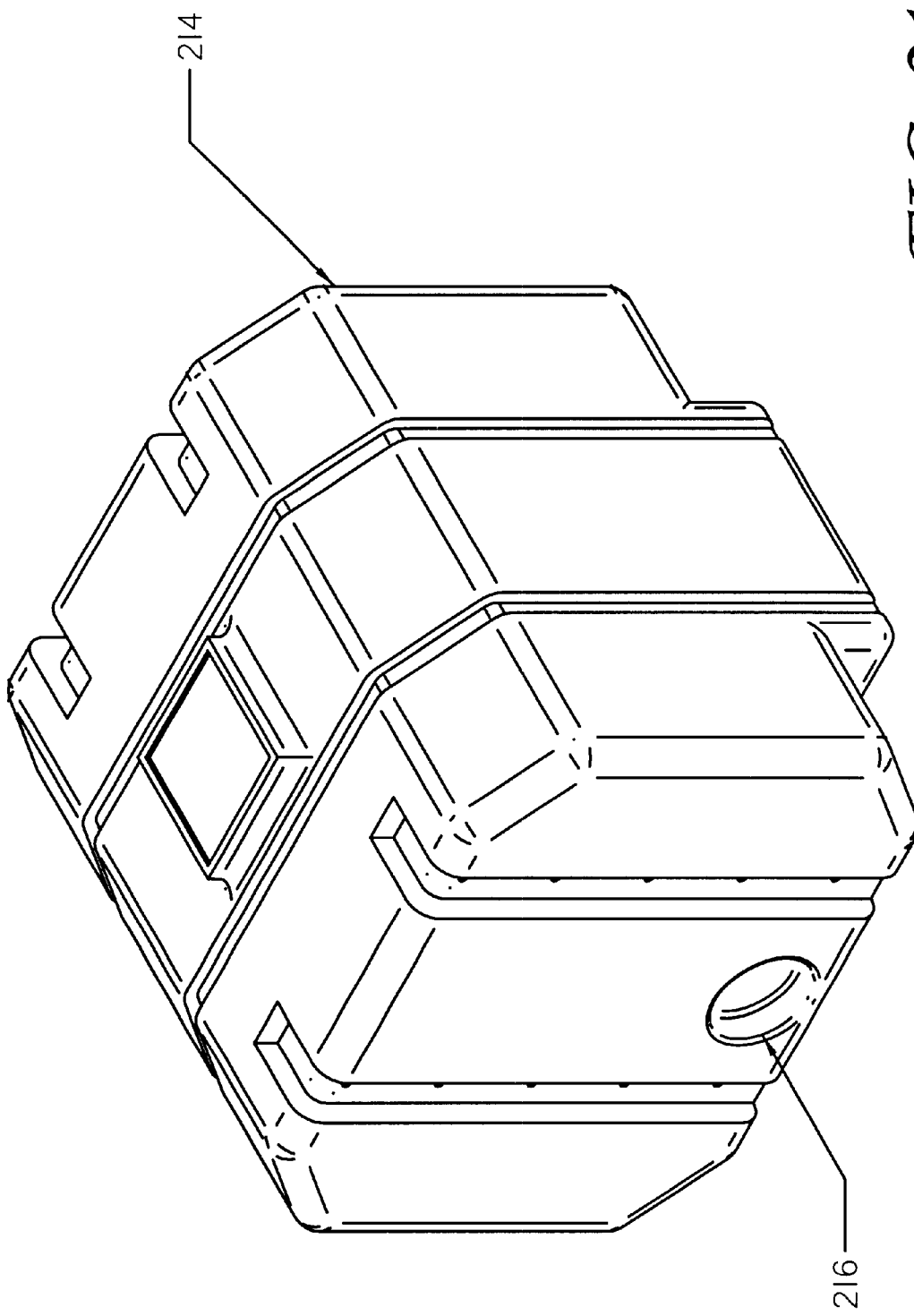
FIG. 21 illustrates a single module for vehicular use.
Figure 22:
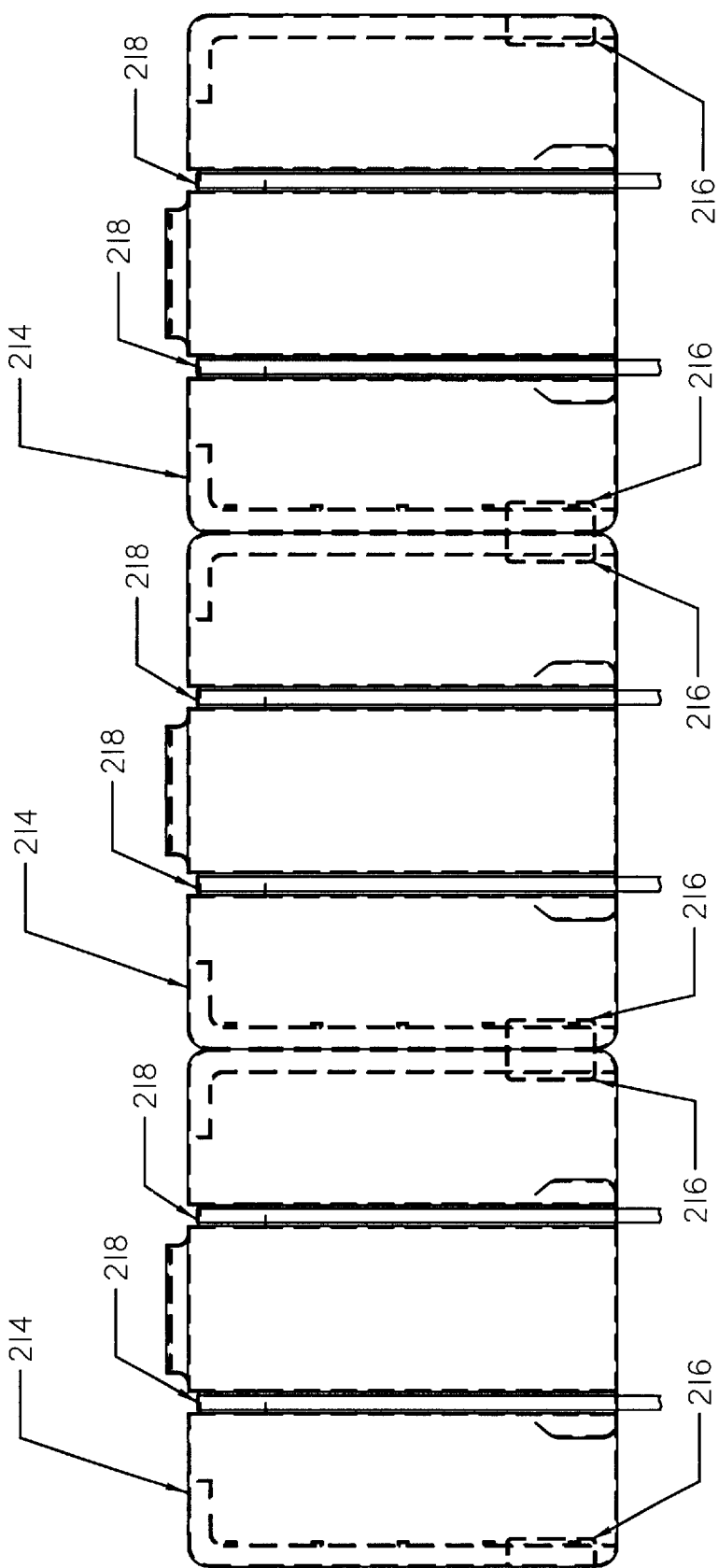
FIG. 22 provides a side view of the tank of FIG. 20.

The cross sectional view of FIG. 19 illustrates the function of the connection cups. Cups, 210, on the exterior of the tank, have been left sealed. Cups, 212, on the interior of the tank, have been cut out and interconnected with a length of pipe, 132, resilient sleeves, 130, and band clamps. The details of these connections are exactly as in FIG. 7

Figure 23:
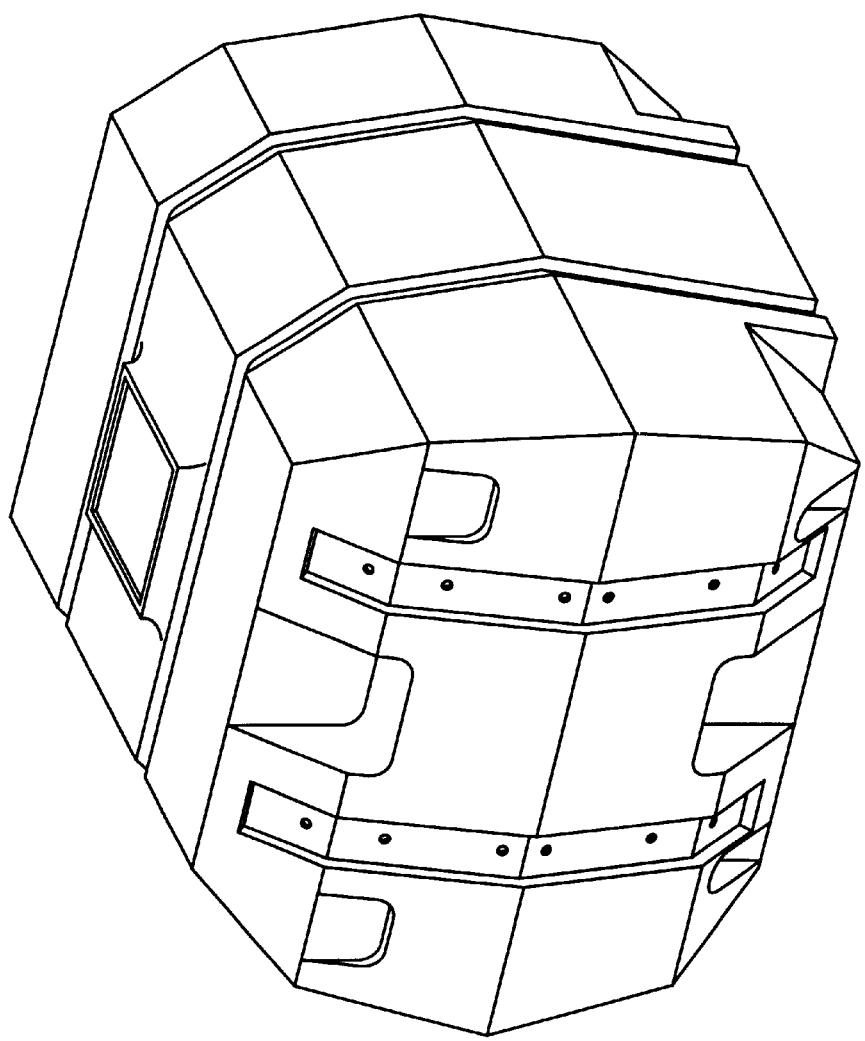
FIG. 23 illustrates a single special module for the front or rear of a set mounted on a vehicle.

The inventive systems is also readily adaptable to a truck mounted tank system as illustrated in FIGS. 20–23. As above, the tank is comprised of multiple modules, with optional fluid interconnection by means of cups, 216. Tie down straps, 218, secure the tank to the bed of the vehicle. Clearly this tank system could also mount directly to the frame of a vehicle or in any other manner as appropriate. If desired, the modules could incorporate internal baffles mounted to the tank using bolts, engaging cups in a manner similar to the above spreaders, or by other means. This approach is especially well suited to applications where a multi-compartment tank is needed, which is common when transporting fuel, as more than one grade is typically carried. FIG. 23 illustrates a specialized module for use at the front or rear of a tank and which provides pre-formed panels for vents, drains, and fills. The panels may be either cut out and/or used to mount fittings.

The features of the present invention, as described above and as illustrated, combine to offer a modular tank design with several advantages over others presently available. Installation and interconnection of the tank is very simple. The individual tanks are small and lightweight, making them easy to handle, transport, and position. Large equipment is not needed. The tanks are easily handled by a back-hoe or skid steer loader. If necessary they can be maneuvered with manual labor. The provision of the alignment cups, and the similar utility of the fluid connection, simplifies relative alignment of adjacent tanks. The flexible coupling is adaptable to varying degrees of misalignment between the tanks. If necessary or preferred, the tanks may be spaced apart and connected by a longer section of pipe, allowing the installation to adapt to the environment. The connection itself is made with common materials and requires little skill to perform correctly. Being inside the tank, the connection is aided by the hydraulic pressure of the contained fluid rather than working against it. It is also protected from environmental factors such as ground water, abrasive fill material, and damage from shovels and other tools during installation. After installation, the connections can be inspected and repaired from within the tank, without requiring excavation.

While the design is not restricted to a single material, rotary molded polyethylene has been found to provide the best performance in the preferred embodiment. This material is inexpensive to form, is impact tolerant and corrosion resistant. The rotary molding process results in a seamless, one piece tank. This is especially beneficial for potable water storage where the lack of seams reduces the likelihood of ground water infiltration and the smooth interior resulting from the rotary molding process eliminates seams, fissures, or joints which could harbor bacteria. The use of other materials would allow this design to be readily adapted to other applications such as chemical or fuel storage.

The modular approach provided by the present invention lends itself to installation of storage systems in remote or restricted access locations. The small size of the individual tanks makes them easy to transport. A single tank can be carried in a pickup truck or on a small trailer making access via a single lane dirt road viable. The light weight means that a tank can be unloaded and placed with relatively small equipment, such as a skid steer loader or farm tractor, rather than requiring a crane. The adaptability to various configurations means that the installation can be matched to the terrain, significantly reducing excavation costs and impact on the surrounding area. An essentially unlimited number of tanks can be combined to create a system of any desired capacity. In the preferred embodiment, only a single size of tank is used, but a combination of sizes could be provided, increasing the total capacity options for the system. Systems of the tanks according to the present invention can be used for potable water storage, fire protection, and septic systems as well as other applications.

While the preferred form of the invention has been disclosed above, alternative methods of practicing the invention are readily apparent to the skilled practitioner. The above description of the preferred embodiment is intended to be illustrative only and not to limit the scope of the invention.

I/We claim:

1. A method of making a connection to a fluid containment tank comprising:
   (a) providing a tank comprising:
      (i) a main body;
      (ii) two end caps integrally formed with said main body thereby forming a hollow substantially closed fluid tight container; and
      (iii) at least one integrally formed fitting extending into and opening into the interior of said tank;
   (d) passing a pipe through said fitting, communicating between the interior and exterior of said tank; and
   (e) positioning a resilient sleeve within the interior of said tank, engaging the outer surface of said fitting and the outer surface of said pipe, providing a flexible, fluid tight seal between said fitting and said pipe, whereby the hydrostatic pressure of a fluid contained within said tank module acts to compress said resilient sleeve causing it to seal more tightly against both said fitting and said pipe.

2. The connection method of claim 1 wherein said sleeve comprises a medial portion of increased diameter.

3. The connection method of claim 1 wherein said sleeve comprises a first end and a second end of different diameters and a medial S-curved portion connecting said first and second ends.

4. A system of modular fluid containment tanks comprising
   (a) at least two hollow, substantially closed, fluid tight tank modules each comprising at least one integrally formed circular fitting extending into and opening into the interior of said tank;
   (b) at least one pipe segment, having two ends, a first end extending through and beyond said fitting into the interior of a first of said tank modules and a second end extending through and beyond said fitting into the interior of a second of said tank modules, thereby providing fluid communication therebetween;
   (c) at least two flexible sleeves, one positioned at each of said pipe ends, engaging the outer circumference of said fitting and of said pipe end, providing a flexible, fluid tight seal between said fitting and said pipe, said sleeves each positioned within one of said tank modules whereby the hydrostatic pressure of a fluid contained within said tank module acts to compress said sleeve causing it to seal more tightly against both said fitting and said pipe.

5. The modular fluid containment system of claim 4 further comprising plural band clamps positioned around said sleeves, compressing said sleeves against said fitting and said pipe.

6. The modular fluid containment system of claim 4 wherein each of said sleeves comprises a medial portion of increased diameter.

7. The modular fluid containment system of claim 4 wherein each of said sleeves comprises a first end and a second end of different diameters and a medial S-curved portion connecting said first and second ends.

8. The modular fluid containment system of claim 4 wherein each of said tank modules further comprises at least one integrally molded, fluid tight alignment cup recessed into the exterior surface of said tank and said system further comprises at least one alignment tube, having a first end received within said alignment cup of a first tank module and a second end received within said alignment cup of a second tank module.

9. The modular fluid containment system of claim 8 wherein at least one of said tank modules further comprises a second of said alignment cups opposite said first alignment cup and a spreader, spanning the interior of said tank, fitted over each of said alignment cups, whereby at least one of said alignment cups both retains said spreader and receives said alignment tube.

* * * * *